G. R. PARANTEAU.
FRUIT HOLDER FOR PITTING MACHINES.
APPLICATION FILED MAR. 16, 1921.
1,392,520.
Patented Oct. 4, 1921.
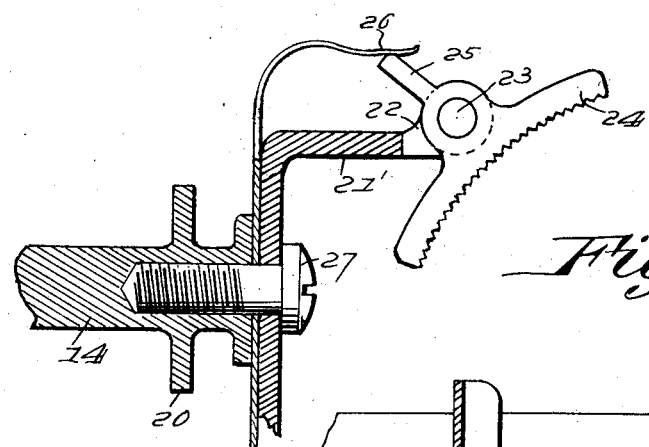
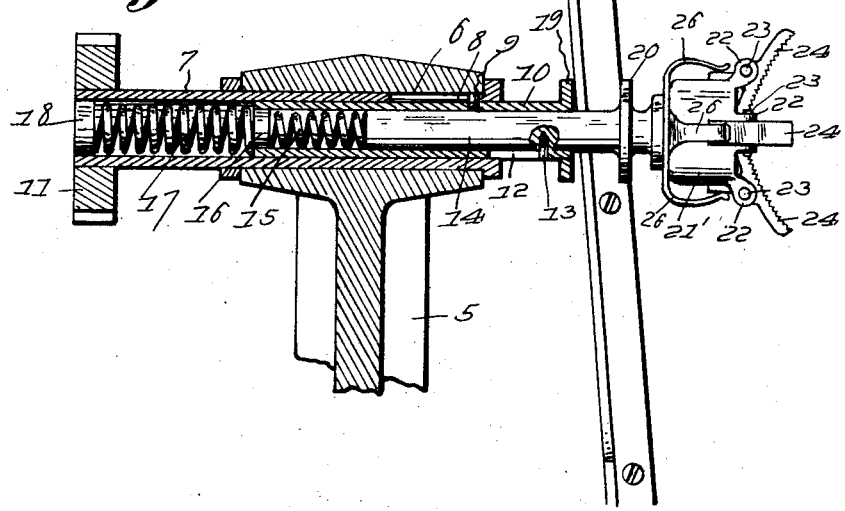
INVENTOR.
BY George R. Paranteau
ATTORNEY.

UNITED STATES PATENT OFFICE.

GEORGE R. PARANTEAU, OF VENTURA, CALIFORNIA.

FRUIT-HOLDER FOR PITTING-MACHINES.

1,392,520.   Specification of Letters Patent.   Patented Oct. 4, 1921.

Application filed March 16, 1921.   Serial No. 452,874.

*To all whom it may concern:*

Be it known that I, GEORGE R. PARANTEAU, a citizen of the United States of America, and resident of Ventura, in the county of Ventura and State of California, have invented certain new and useful Improvements in Fruit-Holders for Pitting-Machines, of which the following is a specification.

This invention relates to fruit holders to be used in connection with fruit pitting machines or the like, the said invention being applicable particularly to machines having pit removers with relation to which the fruit is to be carried and treated, and the holder of this invention is intended to be used in pairs so that the fruit is supported between them and exposed to the action of the pitting element of the machine.

The holder of this invention constitutes what might be termed an improvement on the holders disclosed in my application for patent on fruit pitting machines which was filed on Sept. 21, 1920, Serial Number 411,841, and it is of special importance for use in connection with a machine of the character set forth in the said application, but obviously, these holders may be utilized in other connections or as associated with other machines than that identified in the application and I do not wish to be limited with respect to its embodiment in a machine.

An object of this invention is to produce a fruit carrier having fruit engaging fingers oscillatably mounted on a head, a plurality of fingers coacting to embrace or partially embrace the fruit for holding it against dislodgment while the fruit is being treated as in a pitting machine.

A still further object of this invention is to produce means whereby the fingers articulate and close over portions of the fruit when pressure of the fingers is applied to the fruit, it being understood that the fingers are moved in the opposite direction from that just described by spring pressure, the spring pressure of which is overcome by the force exerted by the fingers against the fruit. Of course the spring should be delicate in order that its tension may be overcome by comparatively slight pressure of the fingers against the fruit; otherwise the fruit might be damaged.

With the foregoing and other objects in view, the invention consists in the details of construction, and in the arrangement and combination of parts to be hereinafter more fully set forth and claimed.

In describing the invention in detail, reference will be had to the accompanying drawings forming part of this application wherein like characters denote corresponding parts in the several views, and in which—

Figure 1 illustrates a sectional view partly in elevation of a fruit holding and carrying device embodying the invention; and Fig. 2 illustrates an enlarged detailed sectional view of the head and finger mounting.

In these drawings 5 denotes a fragment of a wheel having a bearing 6 formed therein, and it will be understood that a wheel may have one or more of such bearings for carrying one or more fruit engaging members, according to the requirements in practice. A hollow spindle 7 is rotatable in the bearing and the said spindle has a longitudinally extending slot 8 in which a pin 9 is slidable, the said pin projecting radially from a tube 10 which slides in the spindle. The spindle in this embodiment of the invention has a spur wheel 11 in order that rotary motion may be communicated to the spindle therethrough. The tube 10 has a slot 12 longitudinally extending therein which receives a pin 13 extending from the plunger 14, the said plunger being urged outwardly by a spring 15 interposed between the inner end of the plunger and the end 16 of the tube. A spring 17 is also interposed between the inner end 16 of the tube and a plug 18 located in the end of the hollow spindle so that the tube 10 is thereby projected in the spindle. The tube 10 has a flange 19 at its outer end and the plunger has a flange 20. The flange 19 is to be engaged by a camming element such as 21 which will serve to press the tube 10 inwardly against the action of the spring 17, and of course when these parts are duplicated on the other side, the fruit holding members will be moved toward and away from each other under the influence of the spring 17 and the camming element 21 respectively.

The flange 20 is intended to be used in connection with the guiding means (not shown)

but disclosed in the application above identified, for imparting motion to the heads when fruit is clamped by the fingers thereof.

The plunger carries a head 21' having apertured lugs 22, each of which lugs carries a pin or pintle 23 on which the fingers 24 are oscillatably mounted. Each finger has a tailpiece 25 which is engaged by a spring 26 secured with the head to the plunger by a fastening 27 such as a screw, and this spring is effective to hold the fingers normally in the position shown in Fig. 1. It will be apparent, however, that when mechanism such as shown in Fig. 1 is opposed thereto and fruit has been interposed between the fingers, the inner ends of the fingers will be pressed inwardly and the outer ends thereof will be caused to partially embrace the fruit, and therefore, the fingers will be moved to a position similar to that shown in Fig. 2, but upon removal of pressure, due to the absence of the fruit, the parts will assmue the position shown in Fig. 1.

It might be well to explain that the elements of the device shown in Fig. 1 are really in the positions they would occupy when they would grasp the fruit, except as to the position of the fingers, for obviously, if the fruit were in engagement with the fingers they would then assume the positions of the one shown in Fig. 2.

It will be obvious from the foregoing description and an inspection of the drawing that if a wheel such as 5 were rotated and provision were made for rotating the plunger through the pinion 11 and parts associated with it, that fruit carried by the fingers would be conveyed in a circular path, and that at the same time the head carrying the fruit would rotate and if a knife were encountered by the fruit, the said fruit would be split and the pit thereof would, upon contacting with the knife, be arrested as to further movement with the wheel 5; whereas the fruit would be carried beyond the knife by the said movement and thus there would be a separation of the fruit from the pit.

As stated previously, this device is primarily intended for use in connection with mechanism referred to in the companion application and it will be apparent that a device of this character could be substituted for any one or more of the device A of the said application to operate in conjunction with the rest of the mechanism of the fruit pitting machine of the said application, so that one skilled in the art will understand the practical utility and operation of the invention. The fingers are adapted to oscillate to cause their diverging ends to close and partially embrace the fruit whereby the fruit is held. Provision, of course, is made for operating the fingers to closed positions by pressure exerted for oscillating the fingers against the action of the springs. In this embodiment of the invention, the force is exerted at a point inside of the pivots or fulcrums or the bearings by which the fingers are oscillatably mounted and this force is exerted, in the present embodiment of the invention, by having the fingers extend inwardly beyond the pivots on which the fingers are mounted, although obviously, any means which could be engaged by the fruit and moved thereby and the movement of which would cause an oscillation of the fingers to cause them to partially embrace the fruit, would perform the function of this invention, the main idea of which is to utilize the fruit or element to be grasped as a part of the means for oscillating the fingers.

I claim:

1. In a fruit carrying device, a wheel having a bearing therein, a hollow spindle rotatable in the bearing, a tube telescopically mounted in the spindle, means for limiting the movement of the tube in the spindle, a plunger telescopically mounted in the tube, means for limiting the movement of the plunger in the tube, a spring for urging the tube outwardly, a spring for urging the plunger outwardly, a head carried by the plunger, fingers oscillatable radially on the head, and means for holding the fingers in normal position.

2. In a fruit holder for pitting machines, a wheel having a bearing therein, a hollow spindle in the bearing, a tube slidable in the spindle, a plunger slidable in the tube, means for urging the tube outwardly, means for urging the plunger outwardly, an element adapted to be rotated for rotating the spindle, a flange on the tube, a camming element engaging the flange for moving the tube inwardly, a flange on the plunger adapted to be engaged by a guiding element for shifting the position of the plunger, a head on the plunger, apertured lugs thereon, pivots in the said apertured lugs, fingers mounted between their ends on the said pivots, and means for holding the fingers in normal position.

3. In a carrier for fruit pitting machines, a plunger, means for rotating the plunger, means for shifting the plunger axially, a head, fingers extending approximately radially thereof and pivotally mounted on the head between their ends, spring exerting pressure for holding the fingers in normal position, the said fingers being adapted to be articulated by pressure exerted on fruit when the plunger is projected.

4. In a fruit carrier for pitting machines, a head, fingers extending approximately radially of and pivotally mounted on the head between the ends of said fingers, means for mounting the head for axial movement, and means for holding the fingers normally open.

5. In a fruit holder for pitting machines, a head, a plunger, means for mounting the plunger for axial movement, a spring interposed between the head and the said plunger, means for securing the said head and spring to the plunger, fingers oscillatably mounted on the head between their ends and extending approximately radially therefrom, and tail-pieces on the said fingers engaged by the spring.

6. In a fruit carrier, a head, fingers radiating from the head and oscillatably mounted thereon, the said device having portions engaged by the fruit and operative to oscillate the fingers, due to the pressure exerted by the contact of the fruit and the said portions.

GEORGE R. PARANTEAU.